Figure 1A:
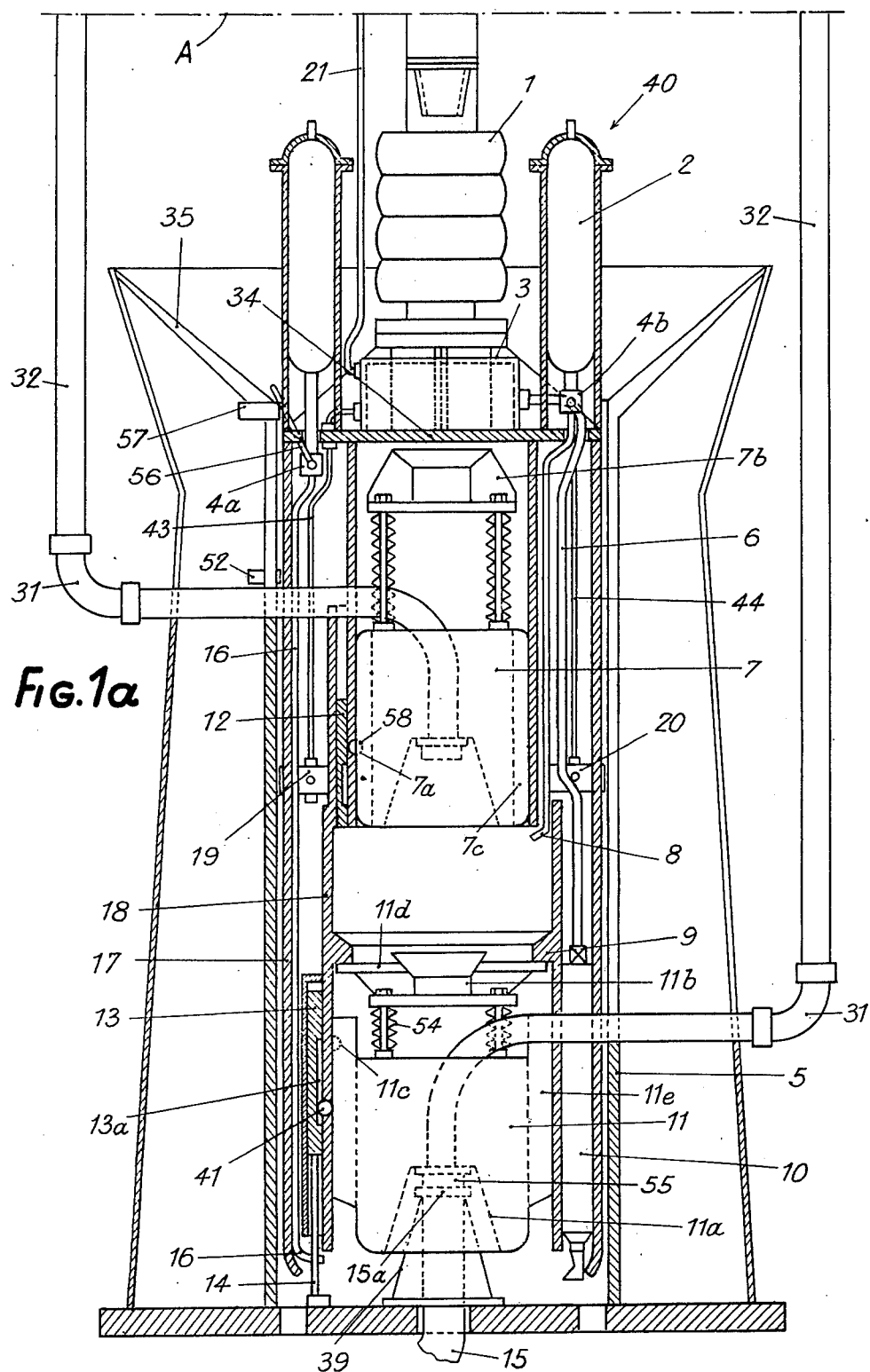

United States Patent [19]

Liautaud

[11] 3,899,894

[45] Aug. 19, 1975

[54] APPARATUS FOR CONNECTION BETWEEN SUBMARINE CONDUITS

[75] Inventor: Jean A. Liautaud, Paris, France

[73] Assignee: Subsea Equipment Associates Limited, Hamilton, Bermuda

[22] Filed: Apr. 3, 1973

[21] Appl. No.: 347,513

[30] Foreign Application Priority Data

Apr. 10, 1972 France .............................. 72.12485

[52] U.S. Cl. ..................................... 61/72.3; 166/.6
[51] Int. Cl. ........................ B63c 11/00; F16l 35/00
[58] Field of Search .................. 61/69, 72.3; 166/.6; 285/18, 24

[56] References Cited
UNITED STATES PATENTS

| | | | |
|---|---|---|---|
| 3,482,410 | 12/1969 | Roesky et al. | 61/72.3 |
| 3,486,556 | 12/1969 | Burgess | 166/.6 |
| 3,503,219 | 3/1970 | Houot | 61/72.3 |
| 3,516,492 | 6/1970 | Petersen | 166/.6 |
| 3,586,103 | 6/1971 | Brown et al. | 166/.6 |
| 3,658,366 | 4/1972 | Welch et al. | 285/24 |

Primary Examiner—Paul R. Gilliam
Assistant Examiner—David H. Corbin
Attorney, Agent, or Firm—Sughrue, Rothwell, Mion, Zinn & Macpeak

[57] ABSTRACT

A submarine connection apparatus for avoiding the necessity of raising to the surface the means used for connecting two submarine conduits. A unit 40 comprising two connectors 7 and 11, which are already connected together by a flexible element 32, are lowered above the first conduit 15 to be connected. The unit 40 is guided by the structure 35, a stop 14 of which strikes the sliding element 13, releases the ball-bearing 41 and enables the connector 11 controlled by the pressure of rim 9 of unit 40 on its control piece 11 d, to engage itself on the flange 15 a of conduit 15. To make the connection, unit 40 is raised out of guide structure 35 and displaced until it is directly over a guide structure similar to 35 surrounding the second conduit to be connected and whose connecting flange is at the level of the second connector 7, the lowering of control piece 7b producing the locking of the connector 7.

13 Claims, 5 Drawing Figures

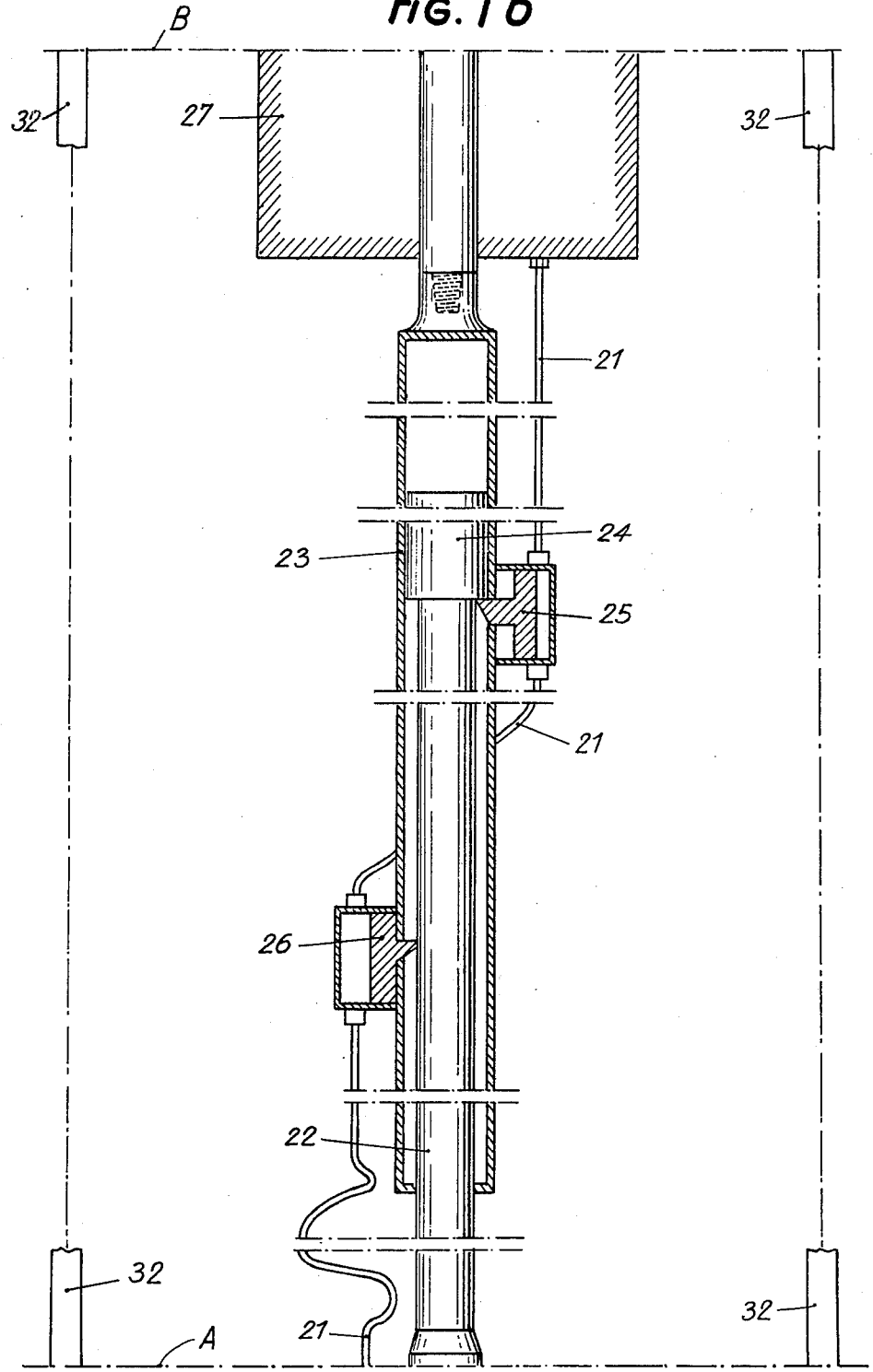

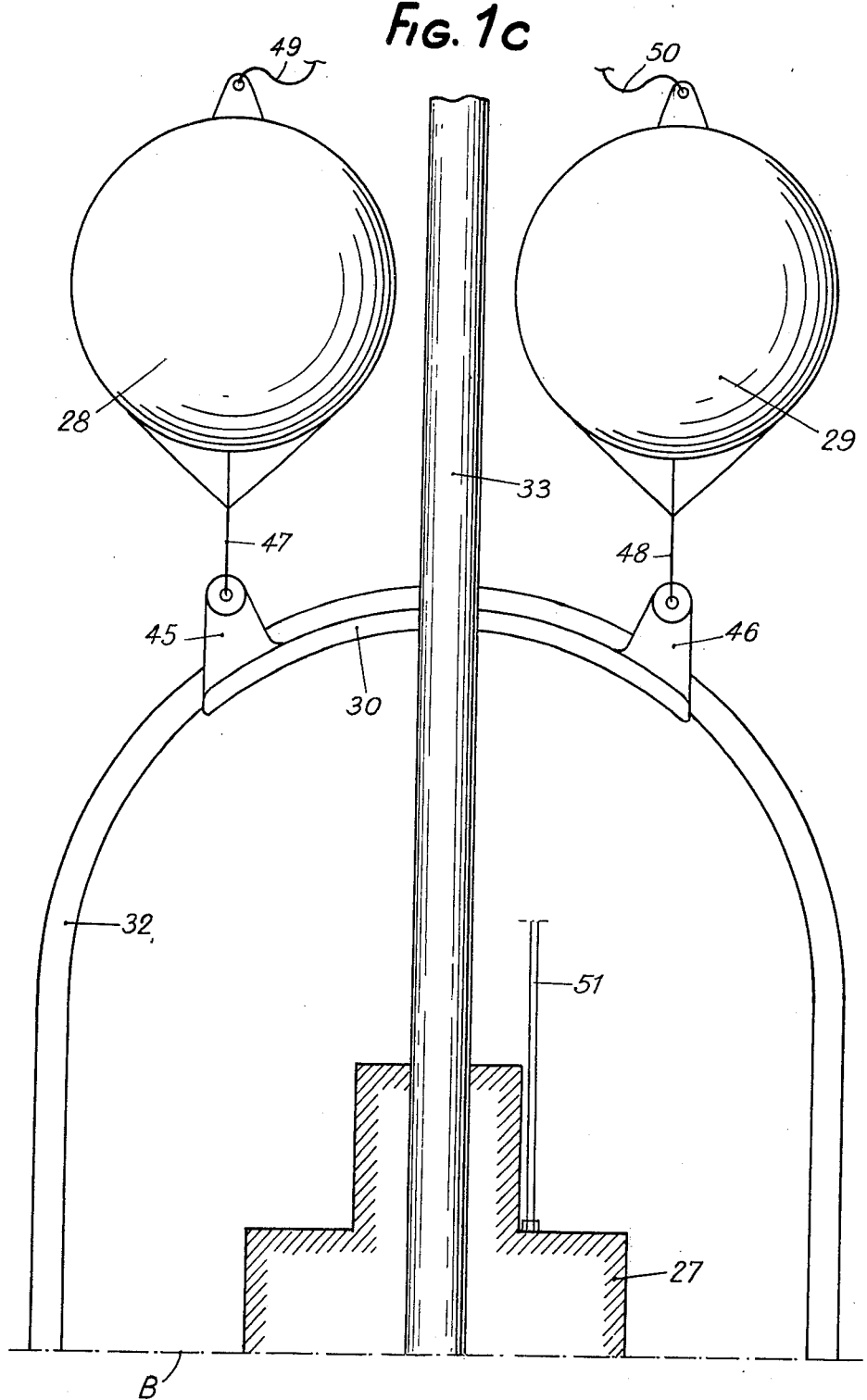

APPARATUS FOR CONNECTION BETWEEN SUBMARINE CONDUITS

The invention relates to apparatus for connecting two conduits arranged on an underwater bed and to a process for putting it into practice which avoids the means necessary for the connection having to be raised to the surface at all during the operation of connection of the submarine conduits.

The connection of conduits arranged on an underwater bed is an operation which particularly arises during the working of a submarine oil-field.

Numerous devices and processes have already been proposed or researched, but they have the disadvantage either of necessitating connection operations of considerable duration or of being complex and inconvenient. Moreover, none of them is satisfactorily applicable to great depths.

The present invention seeks to provide a rapid and simple connection apparatus which enables the connection of the two submarine conduits to be effected in an operation of lowering a support conveying two connectors for automatic locking, mounted at the ends of a connection conduit. The connectors used are of the type described in French Pat. Application No. 72.12239, filed 7 Apr. 1972, by the applicant for: "Tight submarine connector". The U.S. counterpart of that French application is application Ser. No. 347,526, filed Apr. 3, 1973. Once their connection seating is centered on the connection flange of the conduit to be connected, these connectors are able to be locked in this position by simple longitudinal motion of a locking control piece.

The apparatus is characterised relative to previous systems by the fact that it consists essentially of a support mounted at the end of a string of rods, the said support having two connectors of the type indicated above mounted at different levels and connected together by a pipe, each of the connectors being held on the support by a retaining means which gives under a specified load to free it from its support, the latter bearing on the said control piece of the connector, and, secondly, of two vertical guide structures, each surrounding one of the conduits and having at least one stop at a distinct lever cooperating with the said connector retaining means which is associated with it in such a way that the simple lowering of the string of rods vertically over the vertical structure of the conduit to be connected to the lower connector frees the said connector upon meeting the stop and the retaining means of the lower connector, the said connector locking itself on the said conduit by the simple effect of the lowering of the string of rods and its contact with the conduit, the movement of the string of rods up to the guide structure surrounding the second conduit and then its depression causing the cooperating of the stop of the said structure with the retaining means of the upper connector so that, on completion of the lowering motion of the string of rods, the upper connector becomes locked on the second conduit.

The invention increases the reliability of the connection operation on lowering of the string of rods by facilitating the addition of an antiimpact device and by insertion between the support of the connectors and the string of rods of a slide with two retractable stops for retaining the piston, arranged one below the other and each controlled by a feeler, one of the feelers cooperating with a stop of the guide structure surrounding the conduit to be connected to the lower connector, the other cooperating with the stop of the structure surrounding the other conduit.

One embodiment of the invention also makes connection possible in spite of marine fouling which is likely to be deposited on the flanges of submarine conduits by combining the lowering motion of the support in the guide structure of a conduit and the control of a tap having a feeler of a compressed air tank mounted on the support, the said feeler being controlled by a stop of the said structure, so that an injection of air causing turbulence takes place level with the flange of the conduit to be connected. The intense eddies caused by the air-flow entrain the fouling, thus enabling a tight connection to be made between the conduit and its connector.

The invention also facilitates precise and rapid centering of the support of the connectors above each guide structure by incorporating in the base of the said support an emitter receiver locating device the signals of which are transmitted to the control device of a propeller moving the said support as a function of the said signals.

Further features and advantages of the invention will become apparent from the following description made with reference to the attached drawings which represent, as a non-limiting example, a preferred embodiment of the connection system.

Figure 2:
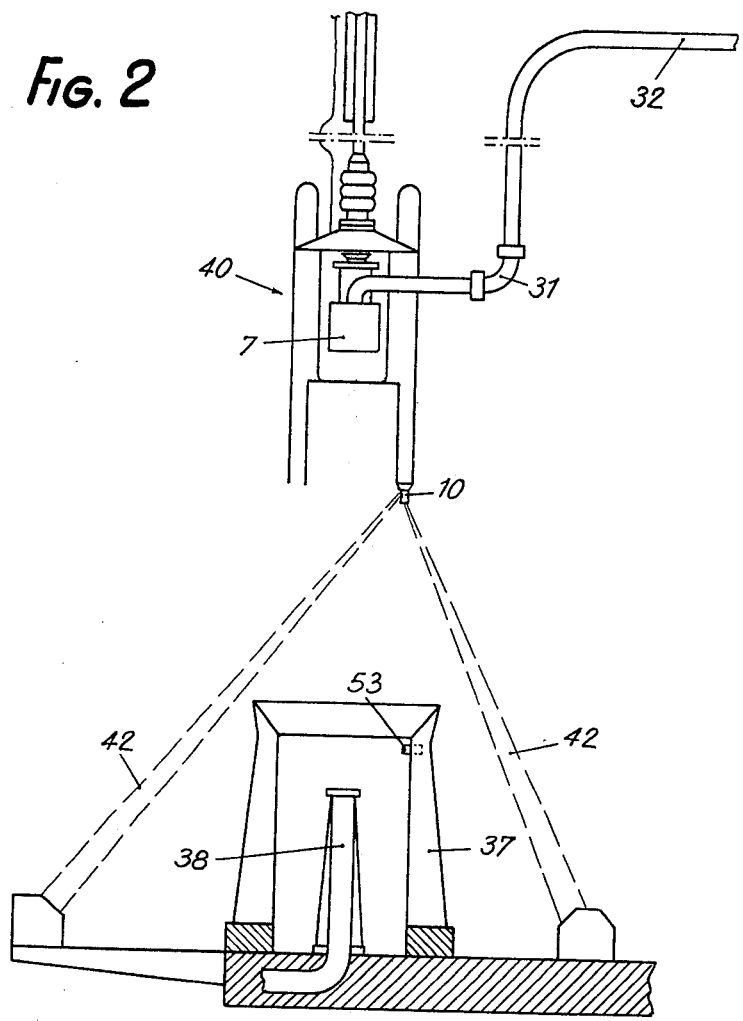

In the drawings:

FIGS. 1a, 1b and 1c represent the partially sectional view of the connection apparatus attached to the end of a string of rods;

FIG. 2 the diagrammatic view of the apparatus during operation; and

Figure 3:
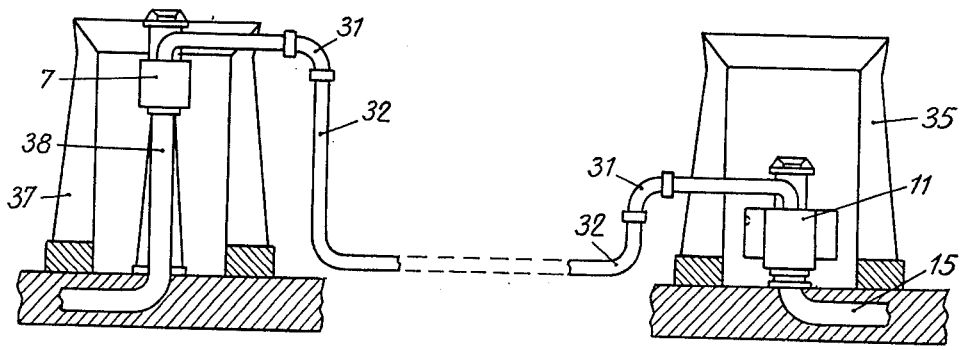

FIG. 3 the diagrammatic view of the connected conduits.

The connection apparatus shown in FIGS. 1a, 1b and 1c, which Figures connect together along lines A and B, consists essentially of a laying device 40 conveying two connectors 7 and 11 connected together by flexible pipe 32. An outer drum 17 protects the assembly of means for using and fixing connectors 7 and 11 enabling submarine conduits 15 and 38 visible in FIG. 3 to be connected together.

Laying device 40 has been shown in FIG. 1a after connection of connector 11 to one of the submarine conduits 15, connector 7 still being in its initial position. The apparatus is shown ready for withdrawal from guide cone 39 surrounding conduit 15 to be placed similarly in guide structure 37, FIG. 2, surrounding the submarine conduit 38 to be connected to conduit 15. FIG. 2 shows laying device 40 with connector 11 removed, the latter having remained connected to conduit 15, FIG. 1a, as will be disclosed below during the explanation of the operation of the device.

Connectors 7 and 11 are connectors of the type already described in the above-mentioned patent application. They are characterized by the fact that all that is necessary is to lower the connector guided by its conical base, such as 11a, around the guide cone such as 39 of the conduit 15 to be connected, to bring a connection seating 55 of the connector into contact with flange 15a of conduit 15, and then to exercise a vertical pressure on a control piece such as 11b to cause the connector to be locked onto the conduit.

As the connector itself does not form part of the invention it will not be described again. However, in FIG. 1a will be seen the respective positions of control pieces 11b and 7b relative to the bodies of connectors 11 and 7. It is self-evident that the connectors, while similar in principle, may have different shapes and dimensions. Thus, in the example shown, control piece 7b has a different shape and height than control piece 11b.

The outer drum 17 rigidly connected to plate 34 is lined with an internal drum 18, itself rigidly connected to the plate. The annular space thus formed contains a location control device 10 for laying device 40 relative to guide structure 37 or guide cone 39 surrounding each conduit to be connected. Device 10 may be a sonar or any other appropriate device. It is linked by connection line 6 to an electronic unit 3.

The annular space between drums 17 and 18 also includes feeler devices 19 and 20 comprising circuit breakers linked respectively via connections 43 and 44 and unit 3 to the web of electric wires 21 supplying the release organs of retractable stops 25 and 26, FIG. 1b. Each feeler is associated with one of the connectors and is controlled by its own stud in the guide structure of the conduit on which the connector to which it corresponds is to be placed. Thus feeler 19 is controlled by stud 52.

Cleaning ejectors 8 and 16, the operation of which is controlled by two taps 4a and 4b with feelers, fixed under bottles 2 mounted on plate 34 ensure the cleaning of the flanges of the conduit to be connected, at the connection level. For this purpose, tap 4a is controlled by lever 56 which is normally in a horizontal position. When laying device 40 is on the point of completing its run, this lever strikes stud 57 and adopts the position shown in FIG. 1a at the end of the run of device 40. The lever of tap 4b for control by a stud of guide structure 37 has not been shown for greater clarity of the drawing.

Connectors 7 and 11 are held in position by sliding locking pieces 12 and 13 which normally lock in the ball-bearings contained partially in housings 7a and 11c of the connectors. In the drawing, ball-bearing 58 is locked between locking piece 12 and connector 7 having housing 7a while ball-bearing 41, initially locked in housing 11c in the casing 11e of connector 11, is passed partially into cavity 13a in locking piece 13 through a port in internal drum 18. Thus, freeing of ball-bearing 41 is produced by the lifting of sliding piece 13 under the effect of meeting stop 14 on lowering of laying device 40 under the action of the ram effect of piston 24 of slide 23, as will be disclosed below. As soon as ball-bearing 41 has left its initial housing 11c, connector 11 can slide freely inside internal drum 18.

In accordance with the process for using laying device 40, the latter is suspended on the string of rods 33, FIG. 1c, by means of a slide 23, FIG. 1b, and a connection 1 of limited flexibility, FIG. 1a. An impact-deadening device situated on the surface of the water in the laying vessel, absorbs a good part of the reciprocating vertical motion caused by the swell. When outer drum 17, at the time of lowering, arrives on guide cone 35, it slides along the cylindrical surface 5, thus obtaining the necessary mechanical centering at the junction of connector 11 and conduit 15. The lowering of outer drum 17 over the conical surface of the guide cone 39 is effected with the use of location control device 10.

This position control device has been shown diagrammatically in FIG. 2, in which laying device 40 is still provided with connector 7 connected by swivel joint 31 and flexible pipe 32 to connector 11 which is already in position on conduit 15. Location control device 10 emits and receives, according to the locating system used, signals along paths shown at 42. Those signals, subsequently progressively intercepted by guide structure 37, serve upon approach of laying device 40 to effect a first centering over the guide structure 37 by means of a self-propulsive device 27. This device, which does not itself form part of the invention, may be of any type and will consequently not be described.

In order to eliminate the remaining reciprocating motion which filters throught in spite of the impact-deadening device situated on the laying boat, the rigid connection between laying device 40 and string of rods 33 is broken by the addition of a slide 23 having retractable stops 25 and 26 controlled electrically by circuit-breaker-feelers 19 and 20 when they are placed in contact with a bent stud in the guide structure.

Although the method of operation of the connection device is preferable carried out using self-propulsive device 27, movement of which is effected in response to information transmitted by location control device 10, it is self-evident that device 27 may only be a simple transmission means controlling, by the signals which it transmits, the starting operation of any motor causing the movement of laying device 40.

When laying device 40, fitted with connectors 7 and 11, has been connected to slide 23, the flexible pipe 32 linking connectors 7 and 11 is hitched onto a support 30 having flanges 45 and 46 at its ends for attachment of weak painters 47, 48 retaining floats 28 and 29. The latter are then connected by untensioned cables 49 and 50 to string of rods 33. Floats 28 and 29 thus keep flexible pipe 32 above laying device 40, thus avoiding risk of the flexible pipe snagging on the bed during the whole manoeuvre.

It is clear that as the lowering of the string of rods vertically over the guide structure can be effected by any conventional means, these means have not needed to be described. Propulsive device 27 may also include any locating means and can transmit any useful information to the surface by means of connection 51 for example. When the device arrives over guide cone 35, control device 10 transmits via connection line 6, electronic unit 3, and web 21 the information necessary for the precise guiding of laying device 40 on the axis of guide cone 35. This approach is facilitated by reason of the anti-impact device installed on the surface and by the attachment of laying device 40 to the string of rods by means of slide 23.

During lowering of laying device 40 into guide cone 35, feeler device 19 enters into contact with stud 52 and triggers the mechanism for release of stop 25, via connection 43, electronic unit 3, and web 21. The release of stop 25 frees piston 24 and, consequently, laying device 40, which is attached to it by rod 22. The drop of the assembly successively causes the lifting of sliding locking piece 13 by stop 14, the disengagement of ball-bearing 41 initially in housing 11c, the freeing of connector 11, and the depression of control rods 54 by means of rim 9 of internal drum 18 and control pieces 11d and 11b, thus causing the locking of connection seating 55 of connector 11 on flange 15a of conduit 15. As the locking device has already been described in the above-mentioned patent application, no purpose will be served by describing it again.

During lowering of laying device 40, lever 56 controlling the opening of tap 4a strikes stud 57 and swivels as shown in FIG. 1a. The opening of the tap causes an ejection of compressed air when the end of cleaning ejector 16 is opposite flange 15a. The eddies of water formed by this ejection ensure the cleaning of connection flange 15a.

Connector 11 being locked on the flange of conduit 15 and being freed relative to internal drum 18, it is sufficient to raise the string of rods for laying device 40, leaving connector 11 on structure 35. The same operation is then begun again with connector 7, which is brought over guide structure 37, FIG. 2, in order to connect it to conduit 38. When location control device 10 ensures the centering of laying device 40 on the axis of guide structure 37, the string of rods 33 is lowered again and a stud 53 enters into contact with feeler 20 which triggers the mechanism for withdrawal of retractable stop 26. The freeing of the piston 24 causes, as before, the drop of laying device 40 and the freeing of connector 7 which becomes attached to conduit 38 when plate piece 34 pushes down control piece 7b, in the same manner as already explained with reference to connector 11, the locking device of which was lowered by rim 9.

Once this connection has been effected, it is sufficient to again raise the string of rods 33 to free flexible pipe 32 from its support 30, FIG. 1c. In fact, as cables 49 and 50 are fastened to string of rods 33 and connectors 7 and 11 are locked on conduits 38 and 15, the raising of the string of rods causes the tensioning of cables 49 and 50 and then the breakage of weak painters 47 and 48. Flexible element 32 then falls onto the bed, as shown in FIG. 3. The junction of two conduits 15 and 38 is thus effected automatically without any manual intervention.

It is obvious that the movement of the device could be controlled, to center it on the axis of a guide structure, by a surface control in response to signals transmitted by the locating device, but whatever the method considered may be, the connection device described above enables the junction of two submarine conduits to be effected without raising the string of rods, which leads to a large saving in time.

What we claim is:

1. Apparatus for providing a connection between a pair of conduits on the bed of a body of water without lifting the apparatus to the surface after effecting the first connection and before effecting the second connection even though the spacing between the conduits is not predetermined said apparatus comprising:
   a. a flexible pipe having a first end and a second end remote from the first end;
   b. a first connector means for attaching said flexible pipe to a first submarine conduit having an open face solely by an external force applied from the surface of the body of water in the direction perpendicular to the open face of the first conduit, said first connector means being attached to said flexible pipe at the first end thereof;
   c. a second connector means for attaching said flexible pipe to a second submarine conduit having an open face solely by an external force applied from the surface of the body of water in the direction perpendicular to the open face of the second conduit, said second connector means being attached to said flexible pipe at the second end thereof;
   d. a laying device;
   e. a first means for detachably mounting said first connector means to said laying device;
   f. a second means for detachably mounting said second connector means to said laying device independently of said first connector means; and
   g. a third means for connecting said laying device to the underwater end of a string of rods.

2. Apparatus as claimed in claim 1 and further comprising:
   a. a support over which said flexible pipe is passed at a point intermediate said first and second connector means;
   b. a float connected to said support by a weak painter; and
   c. means for connecting said float to the string of rods in an untensioned fashion.

3. Apparatus as claimed in claim 1 and further comprising:
   a. a float capable of lifting said flexible pipe;
   b. relatively weak means for connecting said float to said flexible pipe; and
   c. relatively strong means for connecting said float to the string of rods in an untensioned fashion.

4. Apparatus as claimed in claim 1 and further comprising means for directing a blast of compressed air against each of the two conduits before said first and second connector means are attached thereto.

5. Apparatus as claimed in claim 1 and further comprising means for eliminating the reciprocating vertical motion of the laying device which would otherwise be caused by the swell.

6. Apparatus as claimed in claim 1 and further comprising a location control device mounted on said laying device, said location control device being adapted to control the horizontal motion of said laying device as it is moved towards each of the two conduits.

7. Apparatus for providing a connection between a pair of conduits on the bed of a body of water without lifting the appratus to the surface after effecting the first connection and before effecting the second connection even though the spacing of the conduits is not predetermined, said apparatus comprising:
   a. a flexible pipe having a first end and a second end remote from the first end;
   b. a first connector means for attaching said flexible pipe to a first submarine conduit having an open face solely by an external force applied from the surface of the body of water in the direction perpendicular to the open face of the first conduit, said first connector means being attached to said flexible pipe at the first end thereof;
   c. a second connector means for attaching said flexible pipe to a second submarine conduit having an open face solely by an external force applied from the surface of the body of water in the direction perpendicular to the open face of the second conduit, said second connector means being attached to said flexible pipe at the second end thereof;
   d. a laying device;
   e. a first means for detachably mounting said first connector means to said laying device;
   f. a second means for detachably mounting said second connector means to said laying device independently of said first connector means;

g. a third means for connecting said laying device to the underwater end of a string of rods;

h. a first guide structure surrounding the first submarine conduit, said first guide structure having two vertical and opposed slots of different length opening at the top of said first guide structure for the free passage of the two ends of said flexible pipe; and i. a second guide structure surrounding the second submarine conduit, said second guide structure having a single vertical slot equal in length to the shorter of the two slots in said first guide structure.

8. Apparatus as claimed in claim 7 and further comprising swivel joints connecting said flexible pipe to said first and second connector means.

9. Apparatus for providing a connection between a pair of conduits on the bed of a body of water without lifting the apparatus to the surface after effecting the first connection and before effecting the second connection even though the spacing of the conduits is not predetermined, said apparatus comprising:

a. a flexible pipe having a first end and a second end remote from the first end;

b. a first connector means for attaching said flexible pipe to a first submarine conduit having an open face solely by an external force applied from the surface of the body of water in the direction perpendicular to the open face of the first conduit, said first connector means being attached to said flexible pipe at the first end thereof;

c. a second connector means for attaching said flexible pipe to a second submarine conduit having an open face solely by an external force applied from the surface of the body of water in the direction perpendicular to the open face of the second conduit, said second connector means being attached to said flexible pipe at the second end thereof;

d. a laying device;

e. a first means for detachably mounting said first connector means to said laying device;

f. a second means for detachably mounting said connector means to said laying device independently of said first connector means;

g. a first guide structure surrounding the first conduit;

h. a second guide structure surrounding the second conduit; and i. means for connecting said laying device to the underwater end of a string of rods, said means comprising a slide having retractable upper and lower stops each of which is operatively linked to its own feeler mounted on said laying device for activation by a stud mounted on one of said first and second guide structures.

10. Apparatus for providing a connection between a pair of conduits on the bed of a body of water without lifting the apparatus to the surface after effecting the first connection and before effecting the second connection even though the spacing of the conduits is not predetermined, said apparatus comprising:

a. a first guide structure surrounding a first submarine conduit having an open face;

b. a second guide structure surrounding a second submarine conduit having an open face;

c. a flexible pipe having a first end and a second end remote from the first end;

d. a first connector means for attaching said flexible pipe to the first submarine conduit solely by an external force applied from the surface of the body of water in the direction perpendicular to the open face of the first conduit, said first connector means being attached to said flexible pipe at the second end thereof;

e. a second connector means for attaching said flexible pipe to the second submarine conduit solely by an external force applied from the surface of the body of water in the direction perpendicular to the open face of the second conduit, said second connector means being attached to said flexible pipe at the second end thereof;

f. a laying device in which said first and second connectors may be independently detachably mounted, said laying device comprising i. an outer drum shaped to cooperate with said first and second guide structures, ii. an internal drum mounted within said outer drum, iii. first retaining means mounted on said internal drum for detachably mounting said first connector within said internal drum, iv. second retaining means mounted on said internal drum for detachably mounting said second connector within said internal drum, and v. means for selectively actuating said first and second retaining means to release said first and second connectors; and g. means for connecting said laying device to the underwater end of a string of drill rods.

11. Apparatus as claimed in claim 10
wherein at least one of said first and second retaining means comprises at least one locking ball bearing housed in said internal drum and a cooperating lateral notch in one of said connector means, said ball bearing being locked by a sliding locking piece situated against the wall of said internal drum opposite from said one of said connector means and further comprising means for causing said sliding locking piece to pass into a position freeing said locking ball bearing from its housing in said one of said connector means during the lowering of said laying device.

12. A process for connecting a pair of conduits on the bed of a body of water without lifting the apparatus employed in carrying out the process to the surface after effecting the first connection and before effecting the second connection even though the spacing of the conduits is not predetermined, said process comprising the steps of:

a. detachably mounting on a first end of a flexible pipe a first connector means for attaching the flexible pipe to a first submarine conduit having an open face solely by an external force applied from the surface of the body of water in the direction perpendicular to the open face of the first conduit;

b. detachably mounting on the second end of the flexible pipe a second connector means for attaching the flexible pipe to a second submarine conduit having an open face solely by an external force applied from the surface of the body of water in the direction perpendicular to the open face of the second conduit;

c. detachably mounting the first connector means on a laying device;

d. detachably mounting the second connector means on the laying device;

e. connecting the laying device to the underwater end of a string of rods;
f. lowering the laying device in the body of water until the first connector means locks onto the first conduit;
g. detaching the first connector means from the laying device;
h. moving the string of rods to the second conduit without lifting the string of rods to the surface;
i. lowering the laying device until the second connector means locks onto the second conduit;
j. detaching the second connector means from the laying device; and
k. raising the string of rods to the surface.

13. A process as claimed in claim 12 and further comprising the steps of:
a. attaching a float to the string of rods by relatively weak means and
b. attaching the float to the string of rods by relatively strong but untensioned means.

* * * * *